United States Patent
Chavakula

(10) Patent No.: US 12,399,553 B2
(45) Date of Patent: Aug. 26, 2025

(54) VIDEO HEADSET

(71) Applicant: Anand Kumar Chavakula, Adelphi, MD (US)

(72) Inventor: Anand Kumar Chavakula, Adelphi, MD (US)

( * ) Notice: Subject to any disclaimer, the term of this patent is extended or adjusted under 35 U.S.C. 154(b) by 0 days.

(21) Appl. No.: 18/818,743

(22) Filed: Aug. 29, 2024

(65) Prior Publication Data

US 2025/0076966 A1 Mar. 6, 2025

Related U.S. Application Data

(60) Provisional application No. 63/628,883, filed on Aug. 31, 2023.

(51) Int. Cl.
| | |
|---|---|
| G06F 3/01 | (2006.01) |
| G06F 3/14 | (2006.01) |
| G06F 3/16 | (2006.01) |
| H04M 1/60 | (2006.01) |
| H04N 23/57 | (2023.01) |
| H04N 23/90 | (2023.01) |
| H04R 1/10 | (2006.01) |

(52) U.S. Cl.
CPC .............. *G06F 3/011* (2013.01); *G06F 3/017* (2013.01); *G06F 3/1423* (2013.01); *G06F 3/167* (2013.01); *H04M 1/6066* (2013.01); *H04N 23/57* (2023.01); *H04N 23/90* (2023.01); *H04R 1/1008* (2013.01); *H04R 1/1025* (2013.01); *H04R 1/1041* (2013.01); *H04R 1/105* (2013.01); *H04R 1/1075* (2013.01); *H04R 2420/09* (2013.01); *H04R 2460/07* (2013.01); *H04R 2499/15* (2013.01)

(58) Field of Classification Search
CPC ........ G02B 27/0176; G02B 2027/0156; G06F 3/011; G06F 3/017; G06F 3/1423; G06F 3/167; H04M 1/6066; H04N 23/57; H04N 23/90; H04R 1/1008; H04R 1/1025; H04R 1/1041; H04R 1/105; H04R 1/1075; H04R 2420/09; H04R 2460/07; H04R 2499/15

See application file for complete search history.

(56) References Cited

U.S. PATENT DOCUMENTS

| | | | |
|---|---|---|---|
| 7,738,434 B1 * | 6/2010 | Reuss ..................... | H04M 1/05 370/338 |
| 11,397,509 B1 * | 7/2022 | Clements ............ | G06F 3/04815 |

(Continued)

*Primary Examiner* — Nelson M Rosario

(57) ABSTRACT

A video headset comprises a left earphone assembly, a right earphone assembly, and a headband assembly having a headband frame. The headband frame comprises a left end portion movably coupled to the left earphone assembly and a right end portion movably coupled to the right earphone assembly. The headset comprises a video screen module connected to each earphone assembly via a boom module. The video screen module comprises video screens including a first video screen and a second video screen pivotally connected to a second video screen. The second video screen faces in an opposite direction from the first video screen. The headset enables to stream both audio and video data at the video screen module. The headset is further configured to connect with external devices and stream data from different external devices on different video screens. The headset has multiple cameras on the headset to enable 360 degree viewing.

27 Claims, 17 Drawing Sheets

(56) References Cited

U.S. PATENT DOCUMENTS

Figure 1:
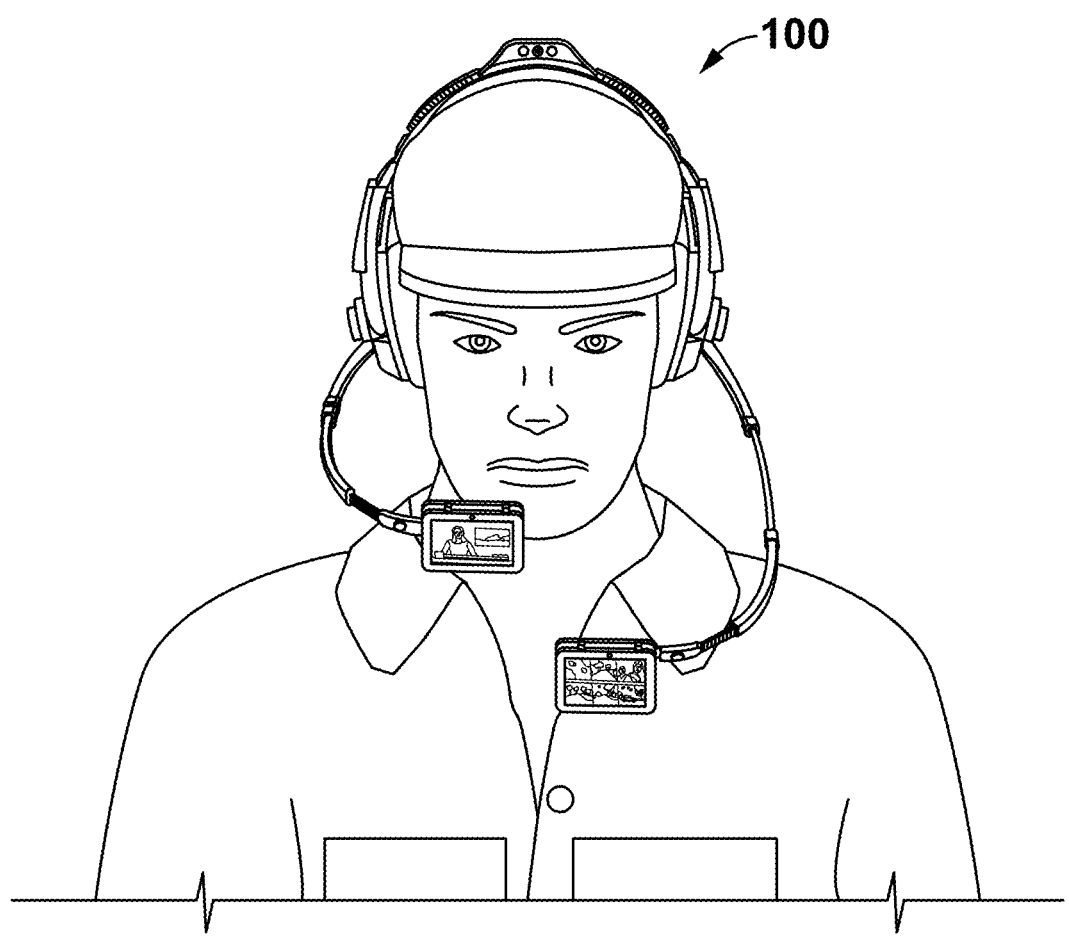

| | | |
|---|---|---|
| 11,907,435 B1* | 2/2024 | Ubilla .................... H04R 1/105 |
| 2006/0119539 A1* | 6/2006 | Kato .................. G02B 27/0176 |
| | | 345/8 |
| 2012/0039481 A1* | 2/2012 | McClain .............. H04R 1/1066 |
| | | 381/74 |
| 2017/0103440 A1* | 4/2017 | Xing ..................... H04W 12/06 |
| 2018/0180894 A1* | 6/2018 | Pombo ............... G02B 27/0176 |
| 2024/0147106 A1* | 5/2024 | Goh ..................... H04R 1/1008 |

\* cited by examiner

VIDEO HEADSET

CROSS-REFERENCE TO RELATED APPLICATION

The present application claims the benefit of U.S. provisional Application No. 63/628,883, filed on Aug. 31, 2023, the entire contents of which are incorporated herein by reference.

TECHNICAL FIELD

The present invention generally relates to a headset. More specifically, the present invention relates to a headset for streaming audio and video data.

BACKGROUND

Headsets are used in a variety of applications, such as telephone communications, artistic performances and dictation. Headsets enable a user to speak into an input means, such as a microphone, or to listen to an audio output of a speaker without having to hold a device, such as a mobile telephone handset, in their hand. The headsets also provide high-quality sound and smart features such as noise cancellation. Further, some headsets further include an adjustable headband that is designed to fit a wide range of head sizes and provide comfort to the users.

Some headsets include buttons that allow a user to perform call-related functions on their mobile telephone handset without the need to handle the handset. For example, a headset may include a volume control button, and a call answer/end button. Some headsets have a boom like structure attached to the headset most commonly from the ear side. Embedded at the end of a typical boom is a microphone that is meant to better capture the audio or voice of a user when that user is speaking.

However, conventional headsets are primarily designed to provide audio functionality, such as listening to music, and making phone calls. Further, conventional headsets lack an integrated visual feature, which forces the user to rely on separate devices, such as smartphones or tablets, to access visual content like videos, notifications, or augmented reality (AR) applications. The disconnection between audio and visual experiences can be cumbersome and inefficient, especially in situations where seamless, hands-free access to both audio and visual features is desirable.

Therefore, there is a need for a headset for streaming both audio and video data and allowing a user to access and interact with multimedia content without needing to use or switch between multiple devices.

SUMMARY

The present invention discloses a video headset for streaming audio and video data. The headset comprises a left earphone assembly, a right earphone assembly, and a headband assembly having a headband frame. The headband frame is adapted to be worn over the head. Further, the headband frame comprises at least one external speaker. The external speakers allow to project sound into a surrounding environment. Further, the headband frame comprises a left end portion movably coupled to the left earphone assembly and a right end portion movably coupled to the right earphone assembly. Further, the left and right earphone assembly is adapted to fit on the left ear and the right ear of a user, respectively.

Further, each earphone assembly comprises a video screen module and a boom module configured to connect the video screen module to the respective earphone assembly. Further, each earphone assembly comprises a housing comprising at least one internal speaker. The housing comprises a portion of surface configured to function as a mouse cursor control to manipulate the video data and audio data displayed at the video screen module from paired external devices. Each video screen module comprises at least two video screens including a first video screen and a second video screen pivotally connected to a second video screen. The second video screen faces in an opposite direction from the first video screen.

The boom module connects the video screen module to the respective earphone assembly. The boom module comprises a boom arm having a first end portion configured to support the video screen module with respect to a field of view of the user and a second end portion coupled to the respective earphone assembly via an adjustable mounting member. The boom module enables to position the video screen module at a position selected by the user. Further, the boom module comprises one channel connected to the respective housing and the boom arm extending from the housing configured to move between an extended state and retracted state.

The headset further comprises a communication module configured to connect with one or more external devices. The headset further comprises a control module in communication with the communication module and video screen module. The control module enables to stream audio and video data at the video screen module. The headset further comprises a block disposed at a top of the headset frame. Further, the block comprises a top side, a front side, and a rear side opposite to the front side.

The headset further comprises a camera module in communication with the control module. The camera module comprises one or more cameras. Further, at least one camera is disposed at the top side of the block to face upwards, at least one camera is disposed at the rear side of the block for a user to see the backside, and at least one camera is disposed at the front side of the block for a user to see the front side. Additionally, at least one camera is integrated with at least one video screen, at least one camera is disposed at a left side of the headset frame for a user to see the left side, and at least one camera is disposed at a right side of the headset frame for a user to see the right side, at least one camera is disposed at a second end portion of the boom arm. Further, the camera is a two-way camera configured to enable two-way video and audio communication. Further, the camera module comprises one or more adjustable cameras to adjust settings and angles of the adjustable cameras.

The headset further comprises a flashlight module in communication with the control module. The flashlight module comprises one or more light sources. Further, at least one light source is disposed at the front side of the block and at least one light source is disposed at the rear side of the block.

The headset further comprises a speaker module in communication with the control module. The speaker module comprises one or more internal speakers, one or more external speakers and one or more mini bass amplifying subwoofers. Further, the internal speaker is configured to deliver sound directly to the user's ear and the external speaker is to project sound into a surrounding environment.

The headset further comprises a motion detector module in communication with the control module. The motion detector module comprises one or more motion sensors. Further, at least one first motion sensor is disposed at the second end portion of the boom arm and at least one second motion sensor is disposed at the headset frame. The first motion sensor enables to track hand movement to control the video screen and enable to control the video screen using hand gestures. Further, the second motion senor enables to detect presence of people proximal to the user.

The headset further comprises a microphone module in communication with the control module. The microphone module comprises one or more microphones. Further, at least one microphone is disposed at the headset frame and at least one microphone at the second end portion of the boom arm.

The control module is configured to connect at least one external device and stream audio and video data of the external device on to the video screen module of left and right earphone assembly. Further, the control module is configured to connect at least two external devices and display video and audio data of each device separately into each of the right and left video screen modules. The control module enables to control the headset using one or more pre-programmed voice commands and enables to automatically accept call using the pre-programmed voice commands. Further, the control module is configured to detect the headset being worn by user and streams audio and video data using internal speakers. Additionally, the control module is configured to detect an absence of headset on the user's head and streams audio and video data using the external speakers. The control module is further configured to detect the headset being worn by user and automatically enables communication using the internal speakers. Further, the headset is configured to operate as an analog audio headset or digital headset.

The headset further comprises a power source module in communication with the control module. The power source module comprises one or more rechargeable batteries and a removable solar power module. The rechargeable batteries are configured to provide power to the headset and the solar power module configured to supply power to at least one of headset and the rechargeable batteries. The headset further comprises an FM and AM frequency based built in radio module in communication with the control module. The headset further comprises at least one slot in communication with the control module which enables the inserting of a memory card to stream audio or video data through the headset.

The headset further comprises one or more ports in communication with the control module. Further, the ports including at least one analog input port and a USB port. The analog input port allows to establish a wired connection with one or more external devices. Further, the USB port establishes a wired connection with one or more external devices to enable the supply of power to the rechargeable batteries. The USB port can also supply digital data comprising of audio, video and other data from a computer or an electronic device.

The headset comprises one or more control buttons in communication with the control module. Further, the control module comprises one or more radio control buttons including a radio frequency search button, a preset button to access stored radio stations, and a volume control button. The control module further comprises an on button to turn on the headset and an off button to turn off the headset. Further, the control module comprises a button to switch between external speakers and internal speakers, and to activate both the external speakers and the internal speakers simultaneously with separate corresponding volume and audio frequency controls to adjust as desired by a user.

The headset comprises video screen modules that are connected to the right and left boom arms that are removable. Likewise, the headband mounted flashlight and camera modules on the top side are removable. The left and right side mounted solar panels on the headband are also removable.

The headset also has a separate USB port to enable the connection of third-party add-on devices to function with all the features of this headset.

The headset is further configured to connect with external devices and stream data from different external devices on different video screens through various wireless technologies along with a GPS module for user tracking. The headset can be used as an analog headset or a digital headset with wired or wireless functionality. Third party Augmented Reality (AR), Virtual Reality (VR), and Mixed Reality (MR) type add-on devices can be attached directly through a dedicated USB port. The headset has programmable voice command technology to operate core features along with auto switching of audio from internal to external speakers based on a user's wearing of the device or proximity to the ear or head.

The above summary contains simplifications, generalizations and omissions of detail and is not intended as a comprehensive description of the claimed subject matter but, rather, is intended to provide a brief overview of some of the functionalities associated therewith. Other systems, methods, functionality, features and advantages of the claimed subject matter will be or will become apparent to one with skill in the art upon examination of the following figures and detailed written description.

BRIEF DESCRIPTION OF THE DRA WINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 1 exemplarily illustrates a video headset for streaming audio and video data being worn by a user, according to an embodiment of the present invention.

Figure 2:
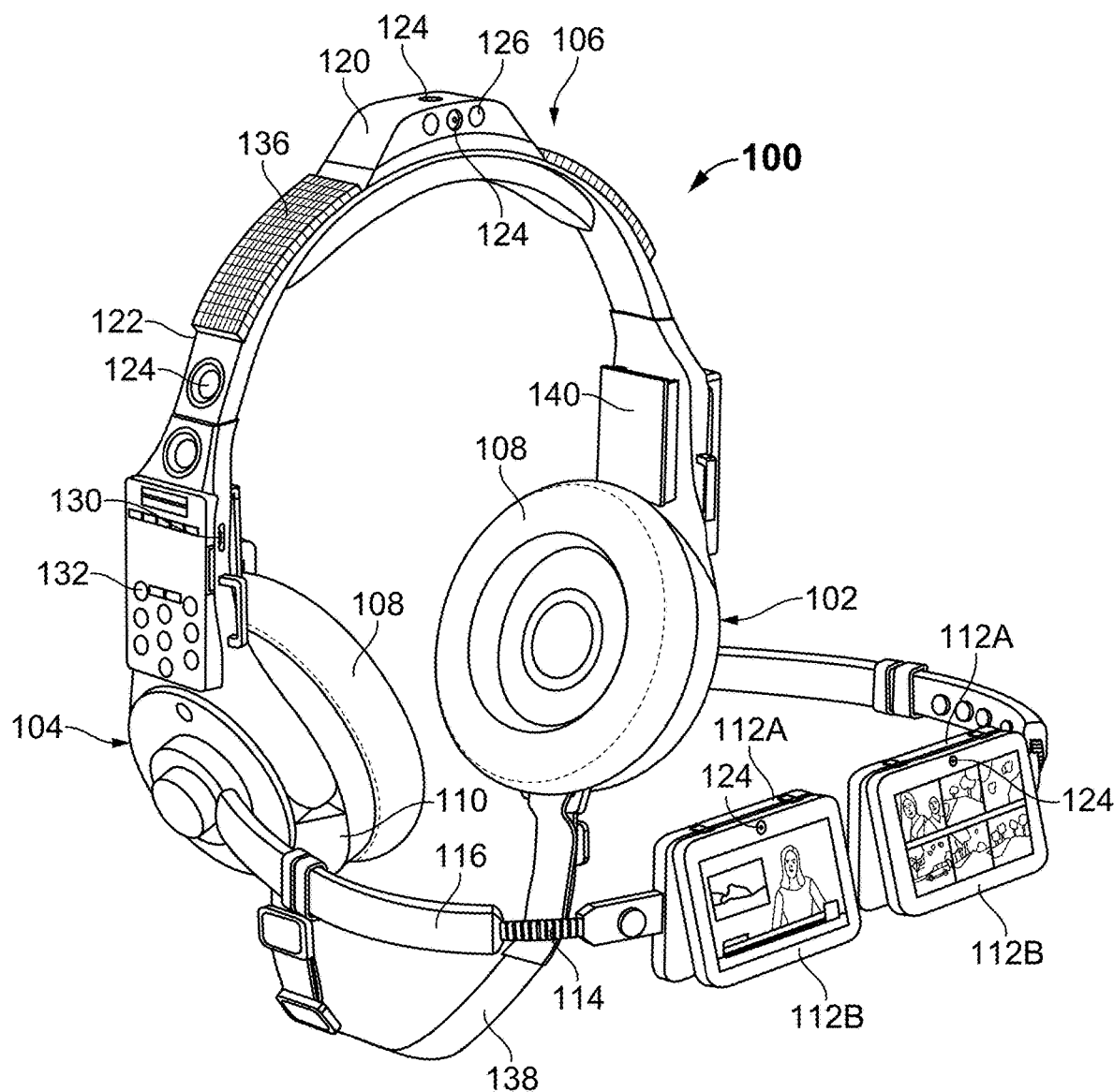

FIG. 2 exemplarily illustrates a front perspective view of the headset, according to an embodiment of the present invention.

Figure 3:
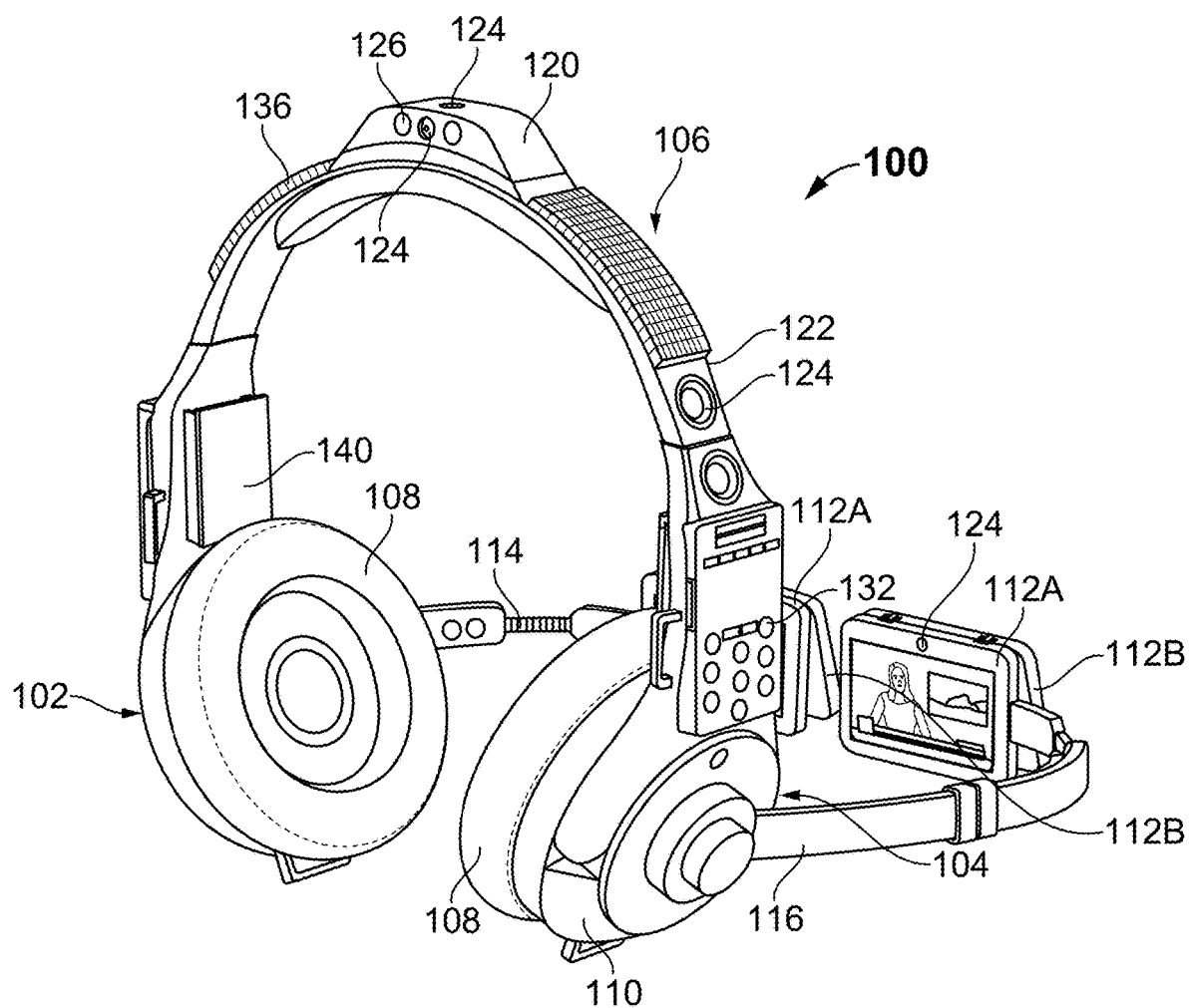

FIG. 3 exemplarily illustrates a rear perspective view of the headset, according to an embodiment of the present invention.

Figure 4:
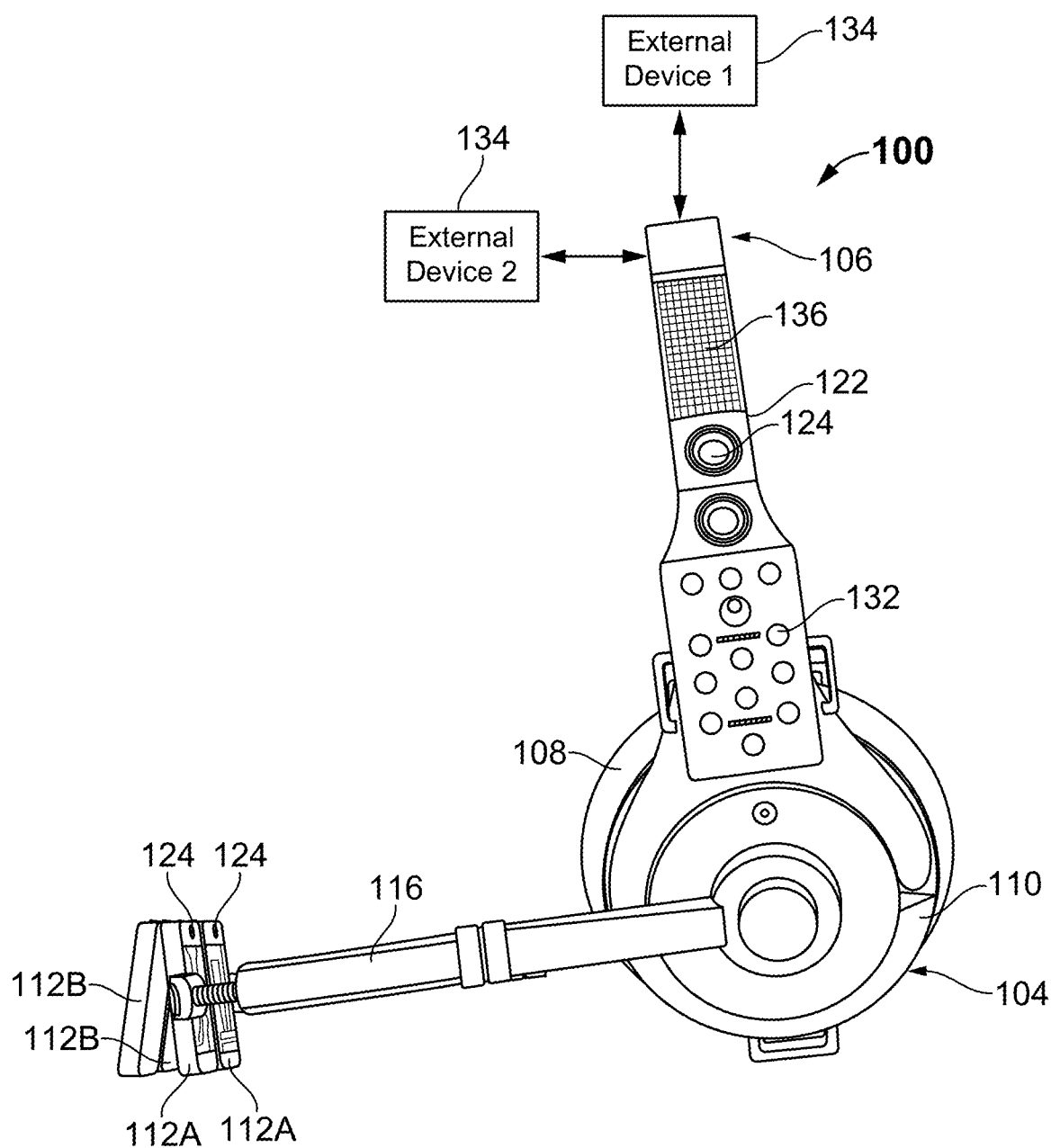

FIG. 4 exemplarily illustrates a boom arm of the headset in a retracted state, according to an embodiment of the present invention.

Figure 5:
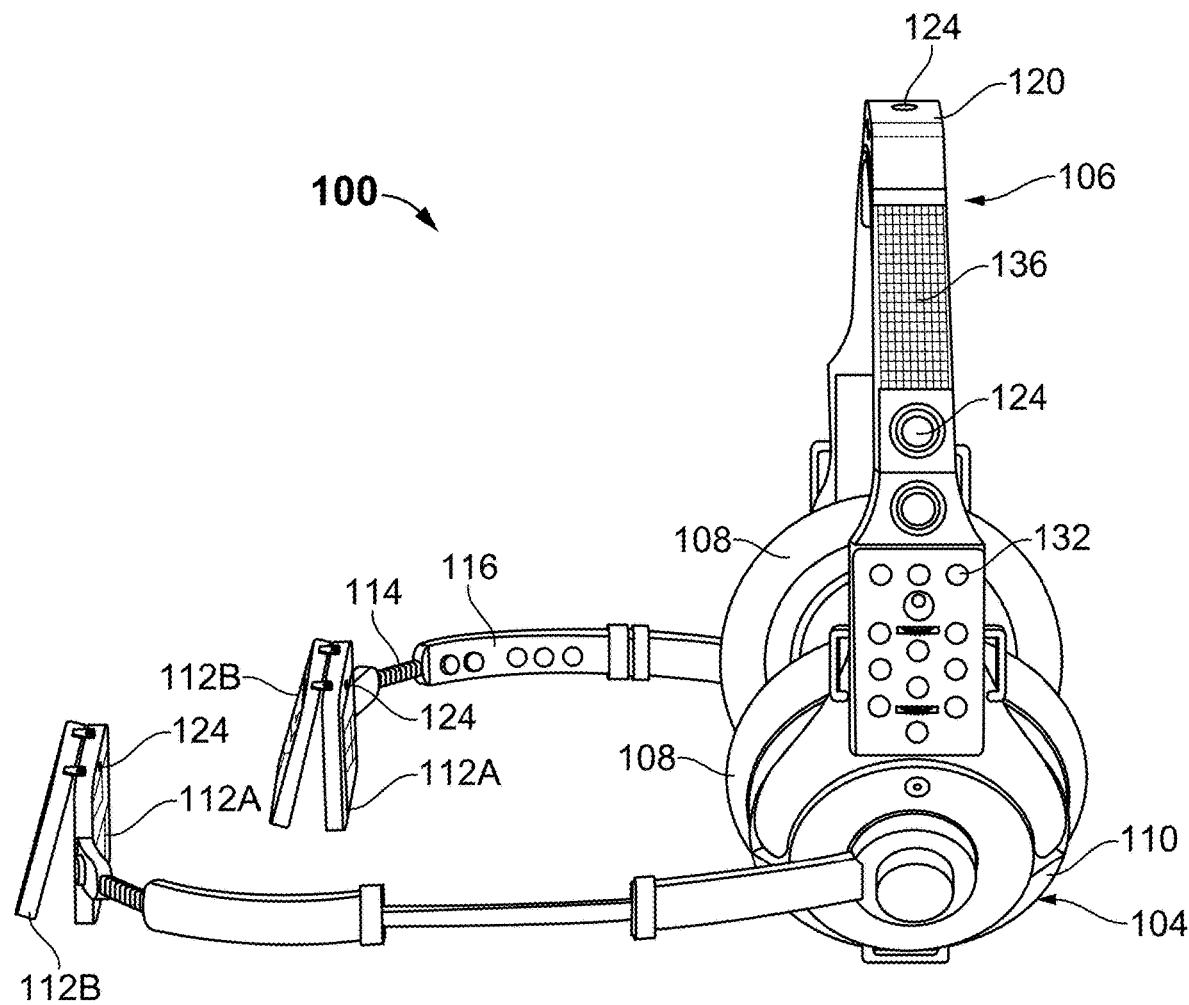

FIG. 5 exemplarily illustrates a boom arm of the headset in an extended state, according to an embodiment of the present invention.

Figure 6:
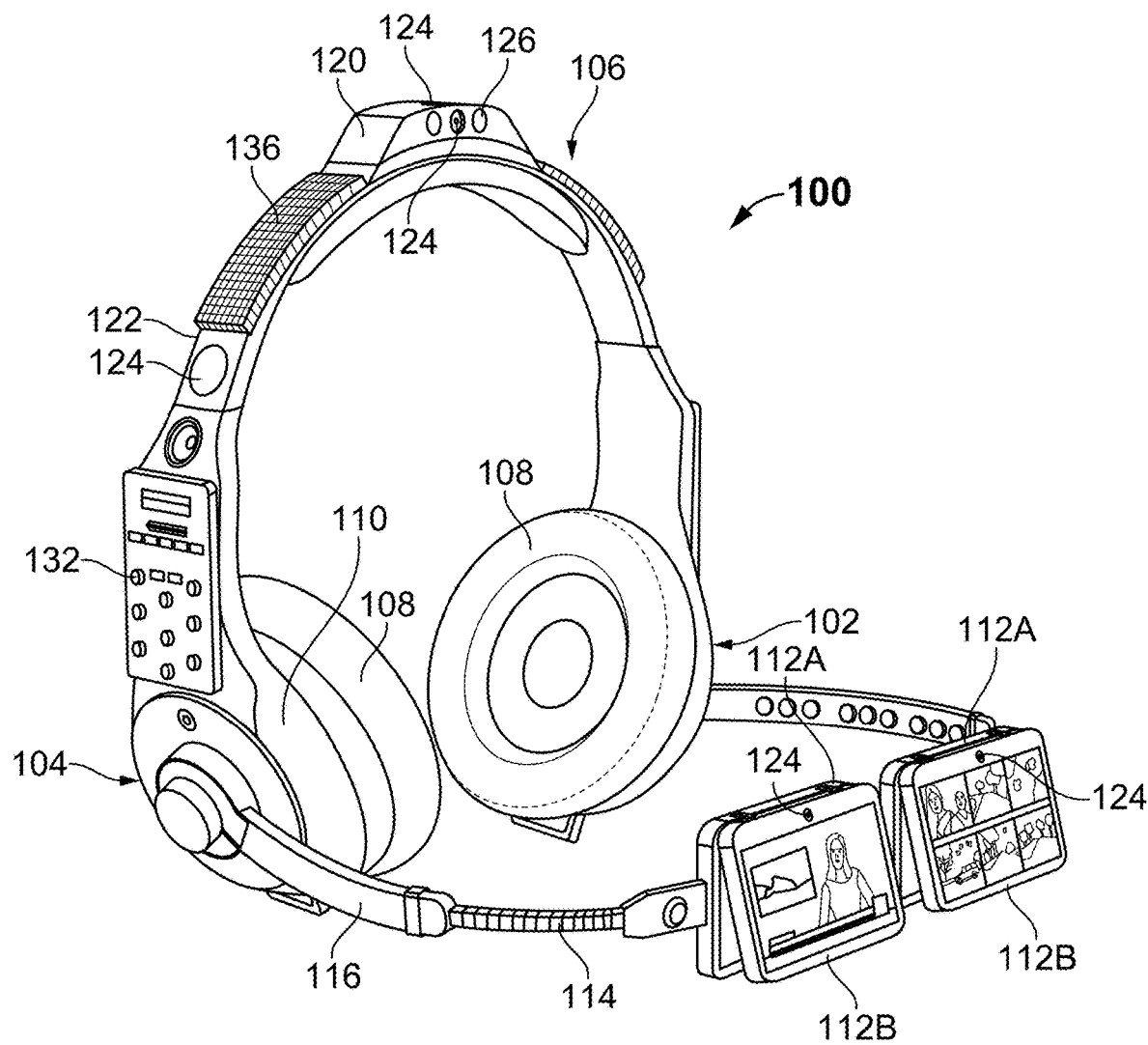

FIG. 6 exemplarily illustrates a boom arm of the headset in a retracted state, according to another embodiment of the present invention.

Figure 7:
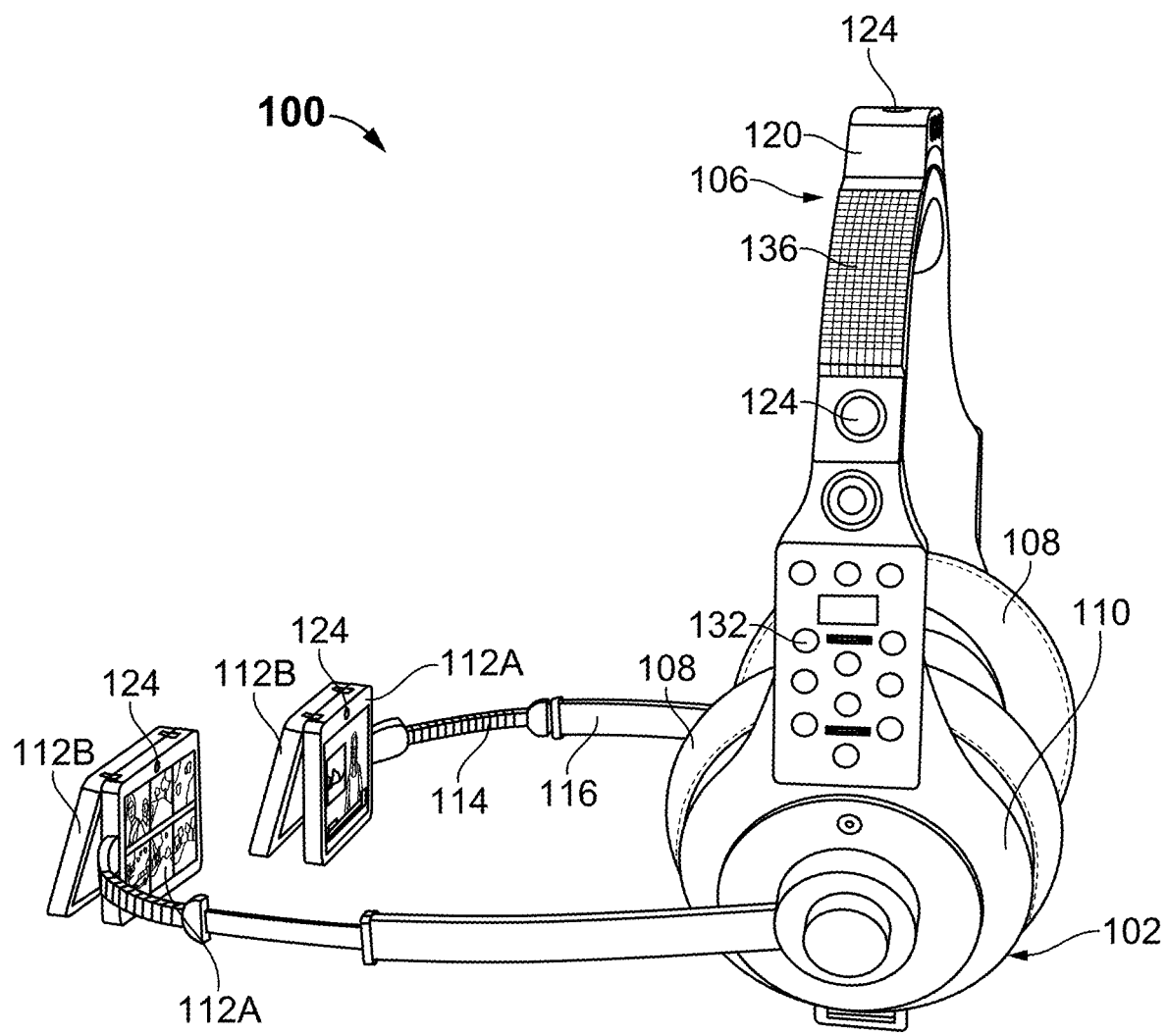

FIG. 7 exemplarily illustrates a boom arm of the headset in an extended state, according to another embodiment of the present invention.

Figure 8:
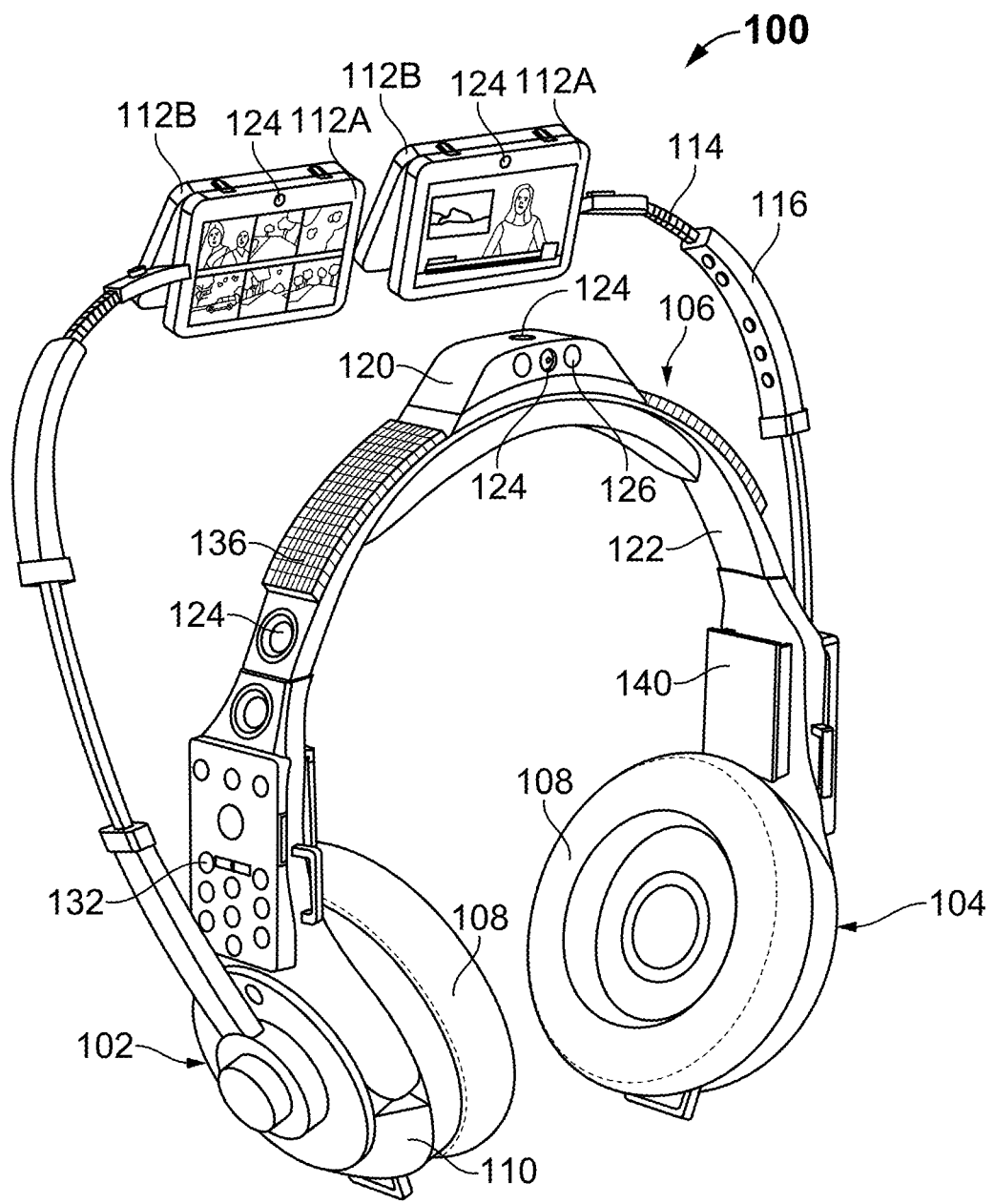

FIG. 8 exemplarily illustrates a perspective view of the headset having the video screen module positioned to face upwards, according to an embodiment of the present invention.

Figure 9:
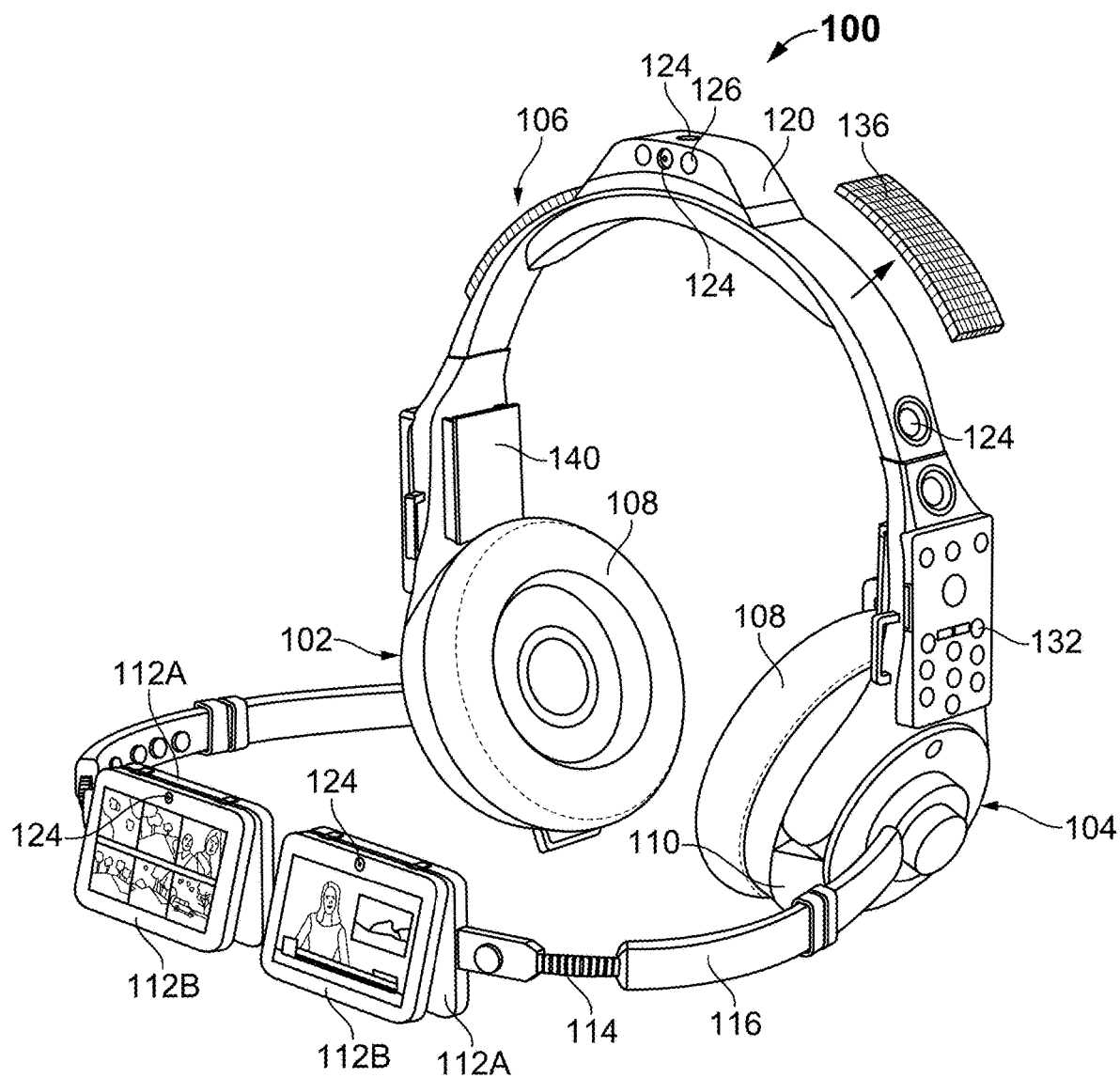

FIG. 9 exemplarily illustrates an exploded view of the headset and a removable solar panel module, according to an embodiment of the present invention.

Figure 10:
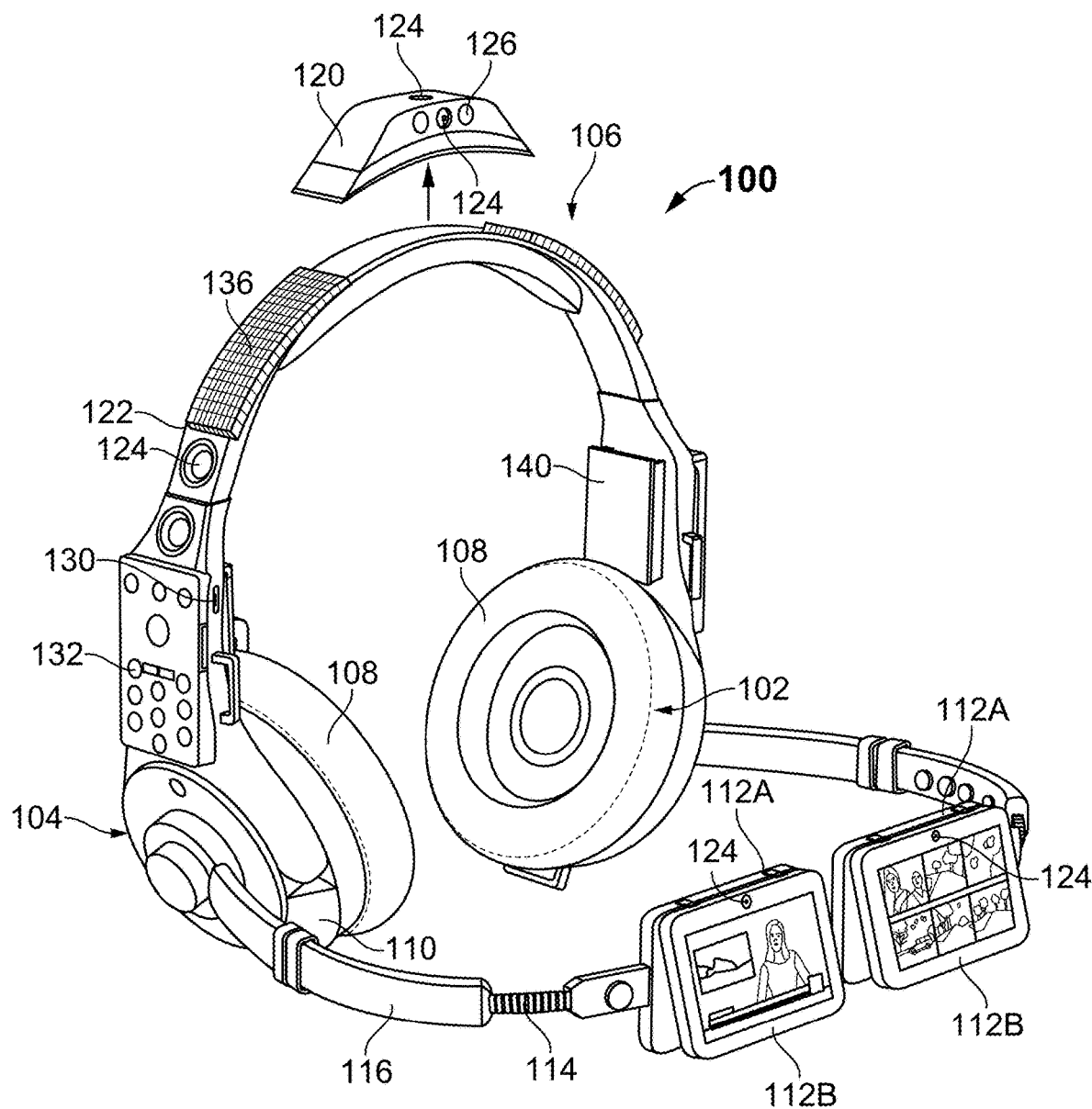

FIG. 10 exemplarily illustrates an exploded view of the headset and a block including cameras and light sources, according to an embodiment of the present invention.

Figure 11:
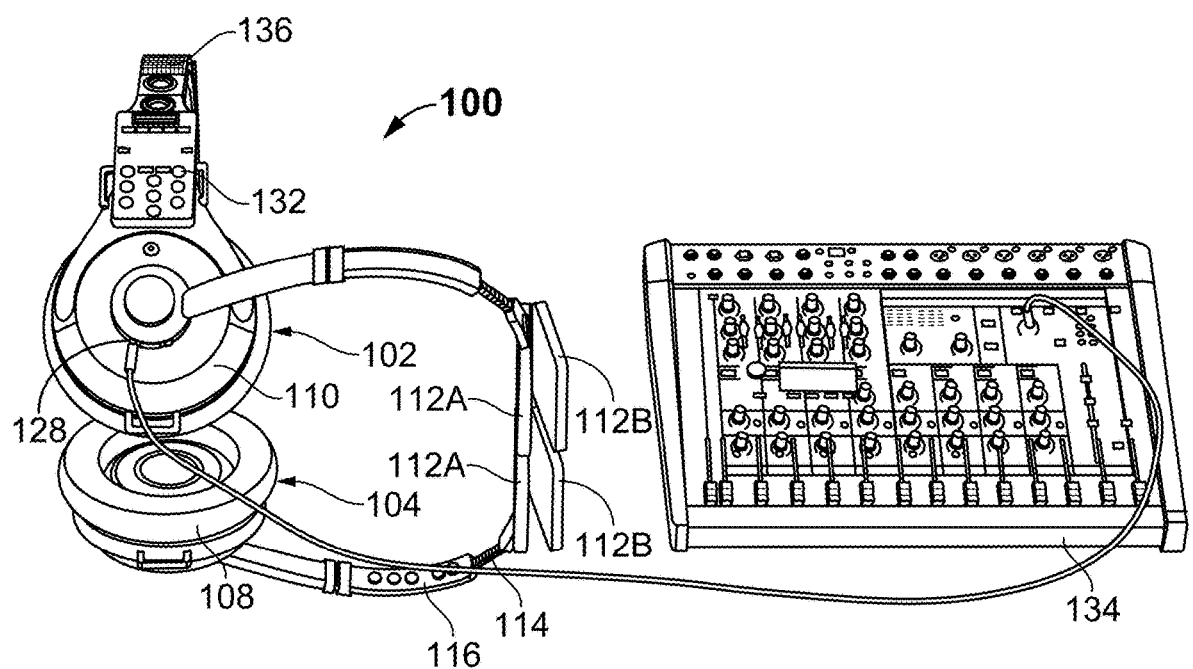

FIG. 11 exemplarily illustrates a perspective view of the headset connected to an external device, according to an embodiment of the present invention.

Figure 12:
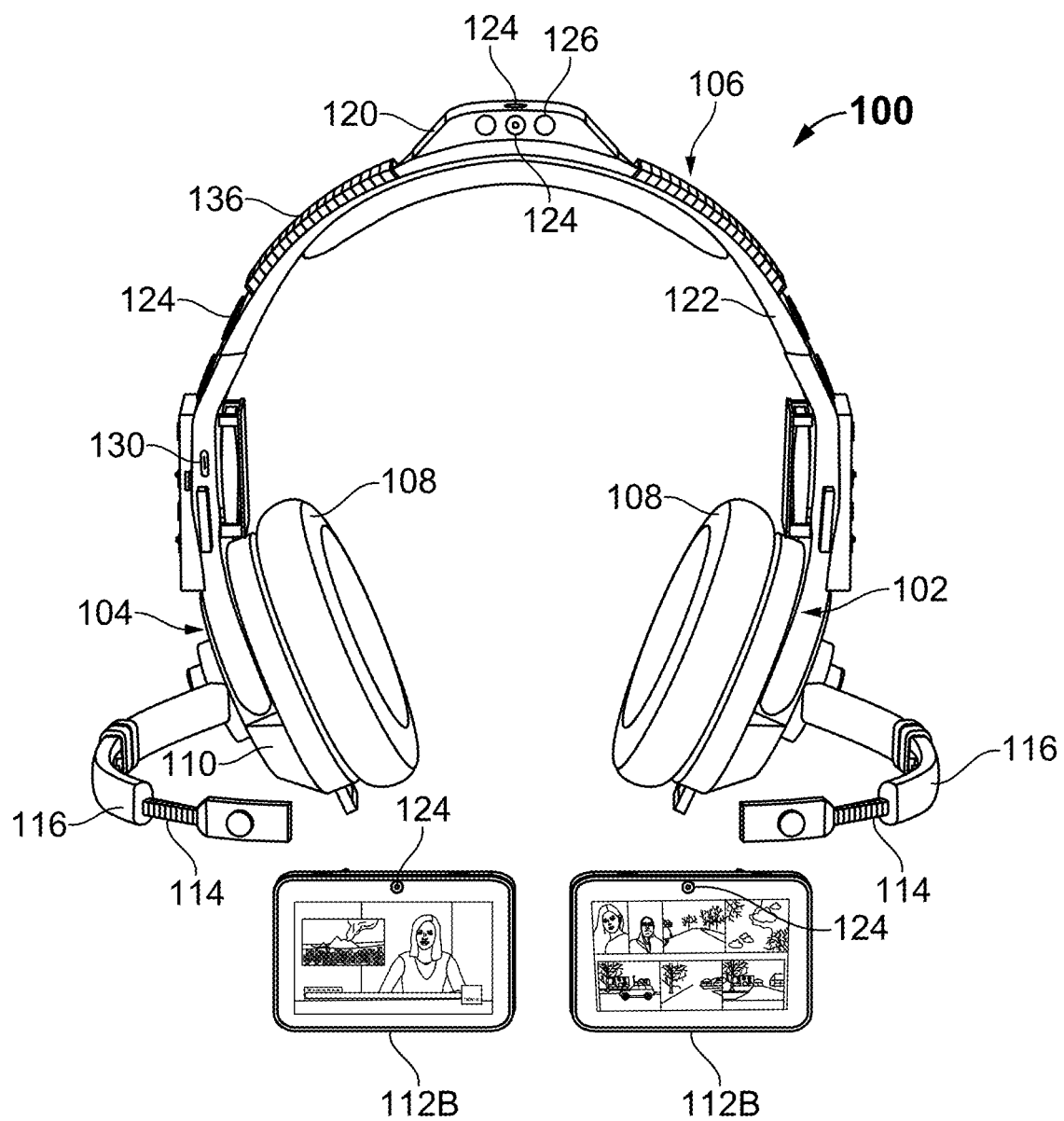

FIG. 12 exemplarily illustrates an exploded view of the headset and removable right and left video screen modules, according to an embodiment of the present invention.

Figure 13:
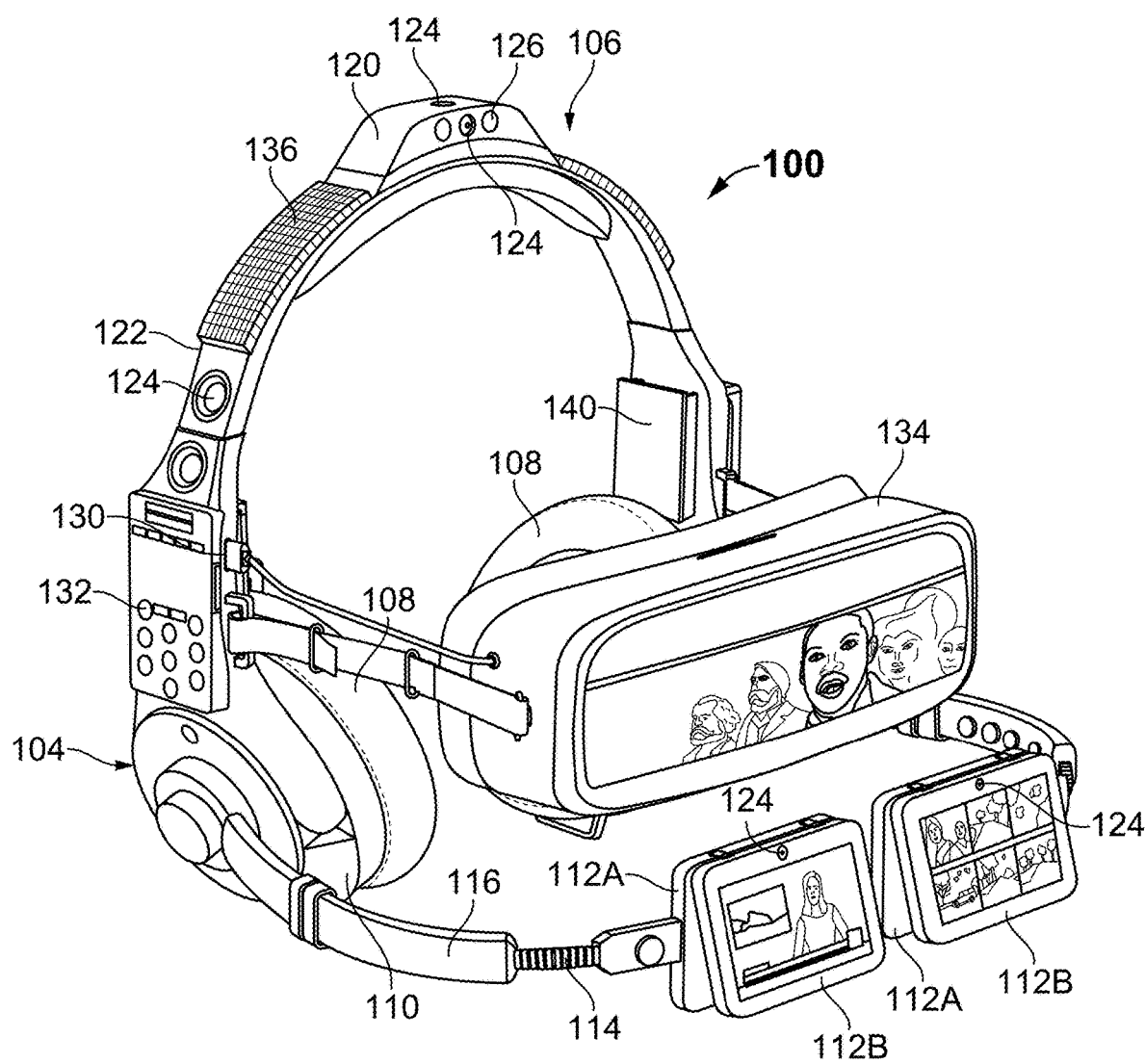

FIG. 13 exemplarily illustrates a perspective view of the headset with an add-on Augmented Reality (AR), Virtual Reality (VR), and Mixed Reality (MR) type device and a headband frame mounted with removable flashlight and camera module at a top portion, according to an embodiment of the present invention.

Figure 14:
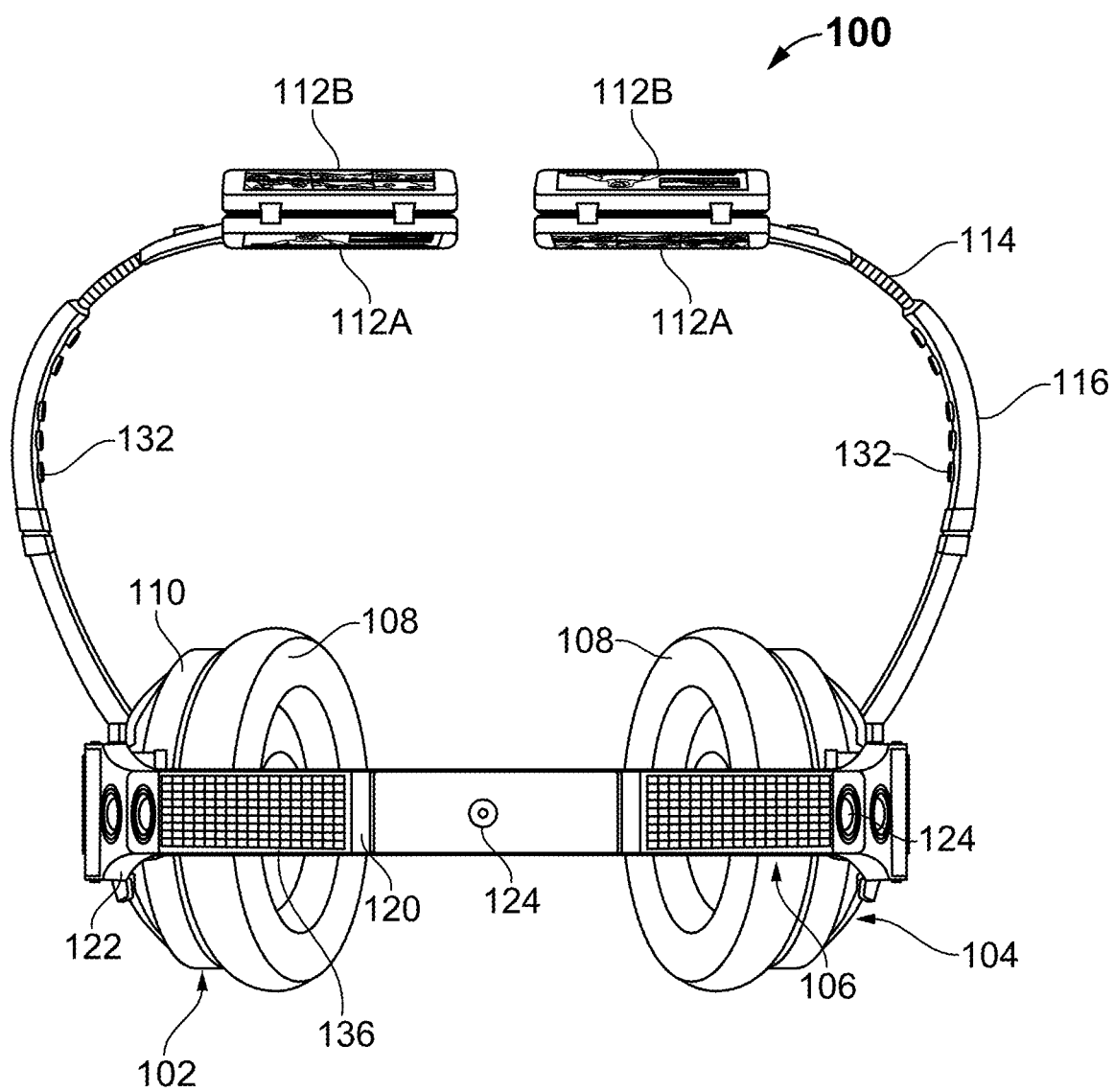

FIG. 14 exemplarily illustrates a perspective view of the headset having control buttons on the left and right boom module, according to an embodiment of the present invention.

Figure 15:
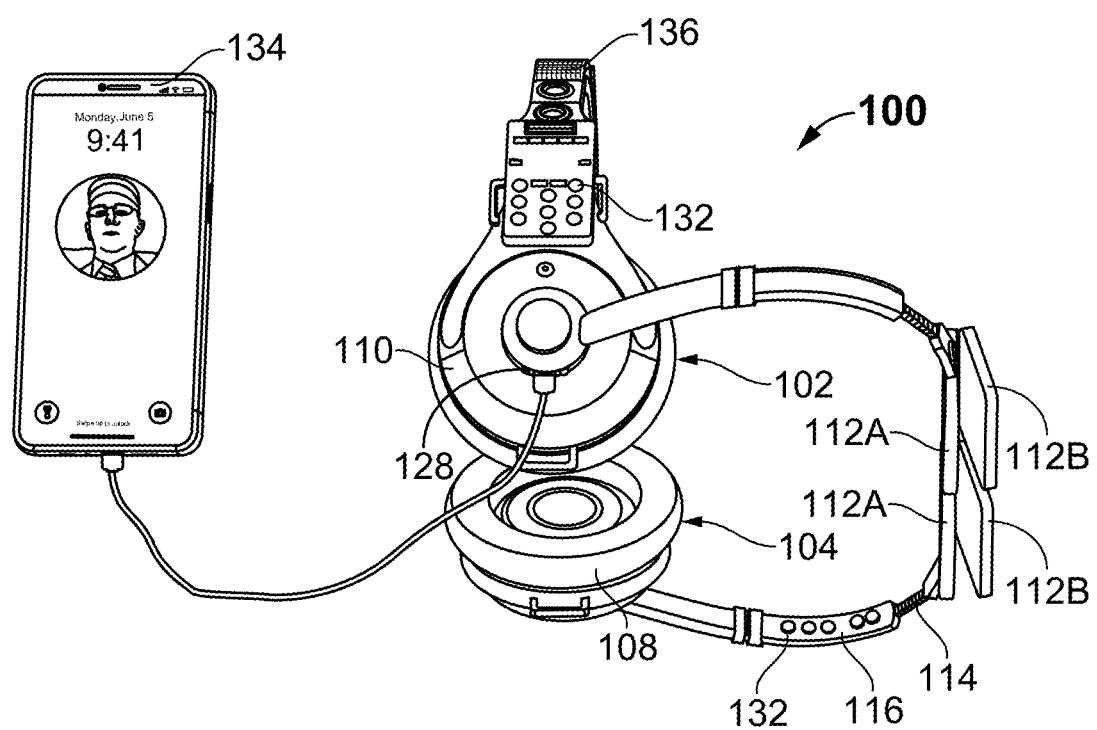

FIG. 15 exemplarily illustrates a perspective view of the headset connected to a smart phone via a data cable, according to an embodiment of the present invention.

Figure 16:
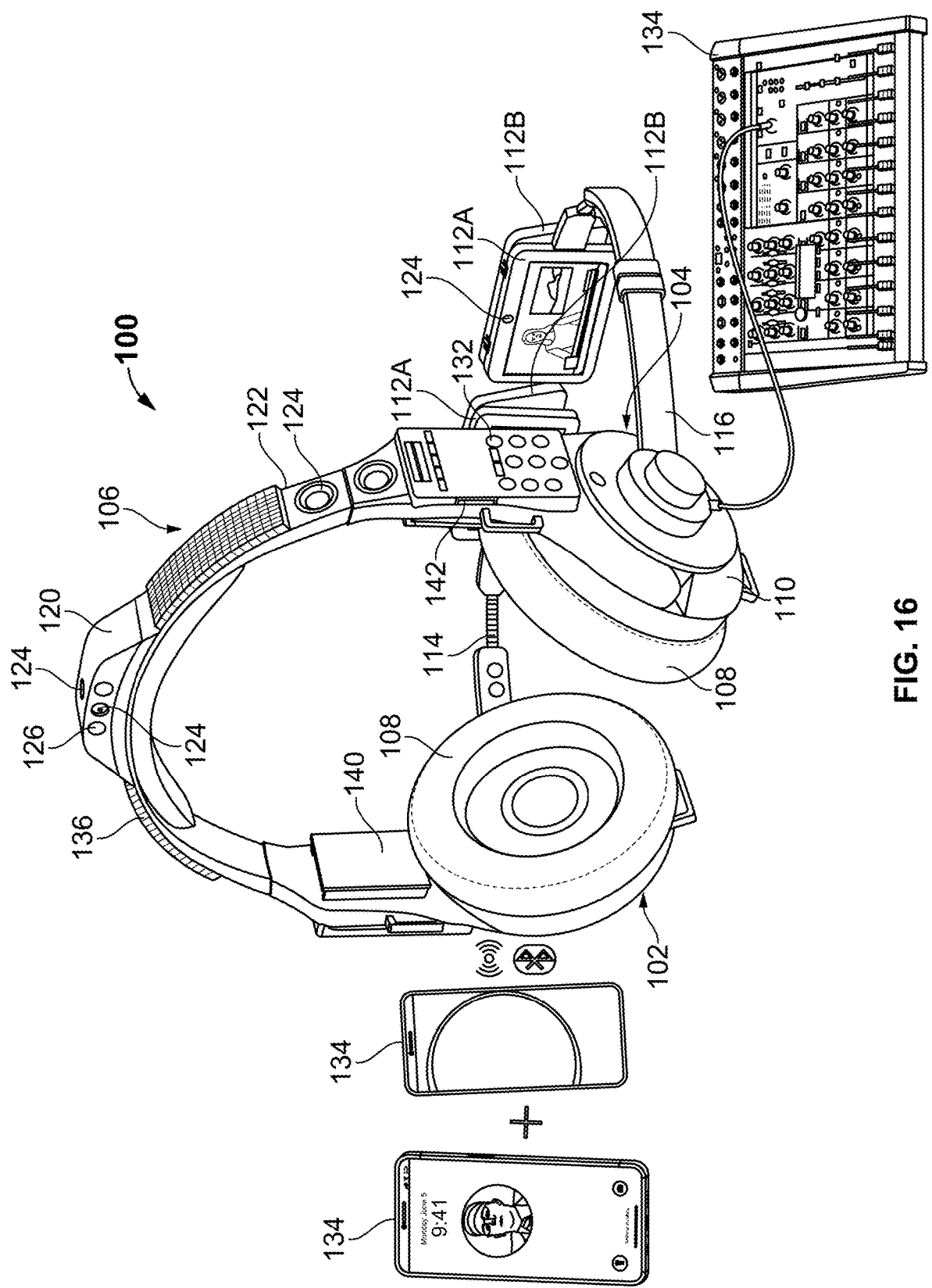

FIG. 16 exemplarily illustrates a perspective view of the headset connected to a plurality of external devices via wired and wireless technologies, according to an embodiment of the present invention.

Figure 17:
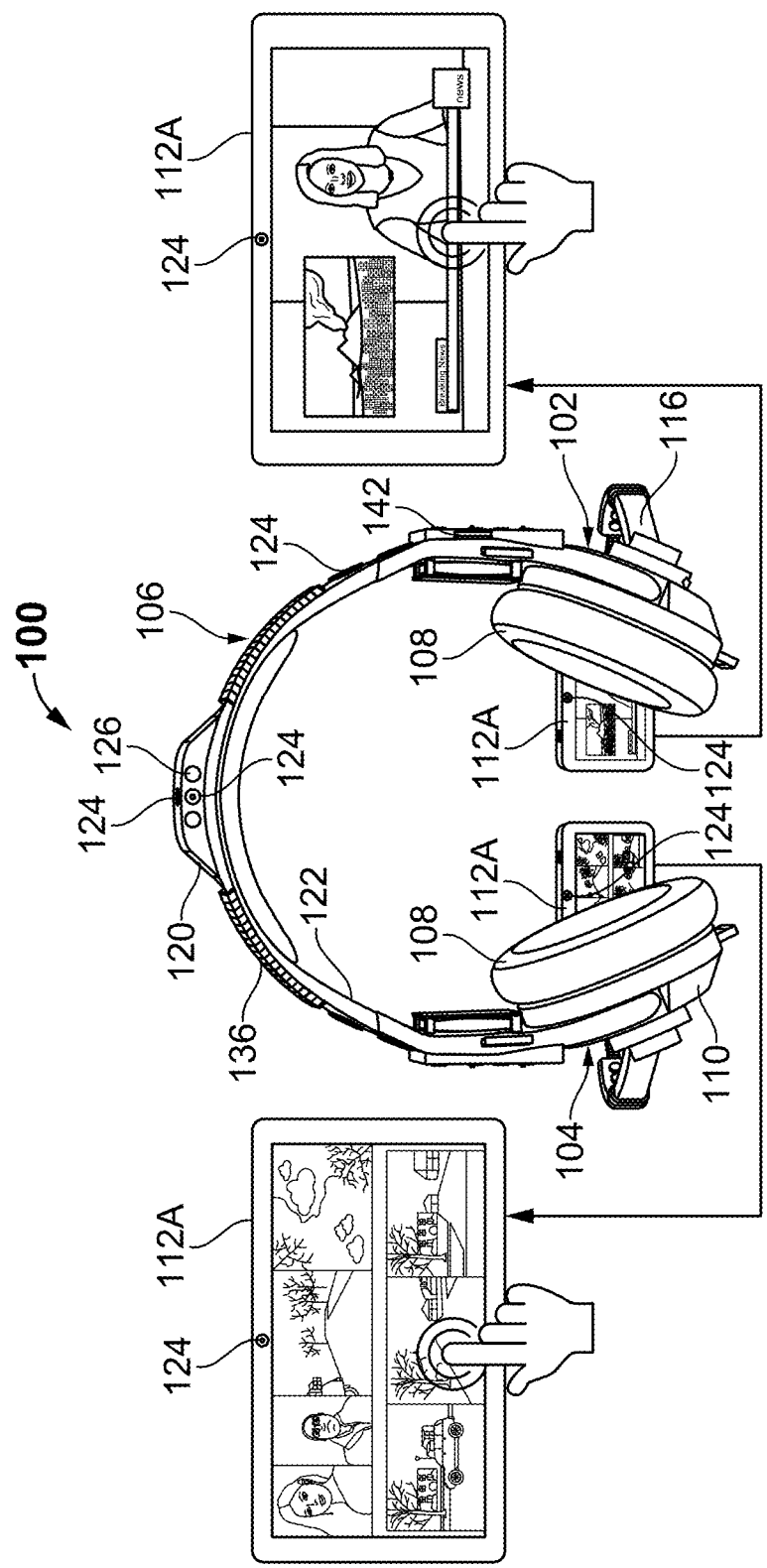

FIG. 17 exemplarily illustrates a headset connected to external devices and a storage slot of the headset with a memory card, according to an embodiment of the present invention.

DETAILED DESCRIPTION OF EXAMPLE EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Referring to FIG. 1 to FIG. 17, a video headset or headset 100 for streaming audio and video data comprises a left earphone assembly 102, a right earphone assembly 104, and a headband assembly 106. Further, the headband assembly 106 comprises a headband frame 122. The headband frame 122 is adapted to be worn by the users. The headband frame 122 comprises one or more external speakers. The external speaker is configured to project sound into a surrounding environment. Further, the headband frame 122 comprises a left end portion and a right end portion opposite to the left end portion. The left end portion is movably coupled to the left earphone assembly 102 and the right end portion is movably coupled to the right earphone assembly 104. The left and right earphone assembly (102, 104) are adapted to fit on the left ear and the right ear of a user, respectively. The left earphone assembly 102 and the right earphone assembly 104 commonly referred to as earphone assembly (102, 104) throughout this document.

Further, each earphone assembly (102, 104) comprises an ear cushion 108, and a housing 110 comprises one or more internal speakers. In one embodiment, the external and internal speakers include earcup style speakers. The internal speaker is configured to deliver sound directly to the user's ear. The housing 110 comprises a proximal side and a distal side opposite to the proximal side. Further, the ear cushion 108 is disposed at the proximal side of housing 110. Further, the ear cushion 108 is configured to provide comfort to the user's ear. The ear cushion 108 is further configured to ensure the sealing around the user's ear and maintain the integrity of the sound produced by the internal speaker. Further, a portion of the distal side of the housing 110 of each earphone assembly (102, 104) is configured to function as mouse cursor control to manipulate the video data and audio data of the headset 100.

The headset 100 further comprises a video screen module and a control module in communication with the video screen module. The video screen module comprises at least two video screens (112A, 112B) including a first video screen 112A and a second video screen 112B pivotally connected to the first video screen 112A. The first video screen 112A and the second video screen 112B are generally referred to as the video screen (112A, 112B) throughout this document. Further, the second video screen 112B faces in an opposite direction from the first video screen 112A. In one embodiment, the first video screen 112A and second video screen 112B supports touch function. The first video screen 112A is facing towards the user and the second video screen 112B is facing towards the third-party present opposite to the user. Further, a portion of the distal side of the housing 110 is configured to function as a mouse cursor control to manipulate the video data and audio data displayed in the video screen module from paired external devices 134. Further, the headset 100 is configured to operate as an analog audio headset or a digital headset.

The headset 100 further comprises a boom module in communication with the control module. The boom module comprises a boom arm 114 having a first end portion and a second end portion opposite to the first end portion. The first end portion is configured to support the video screen module with respect to a field of view of the user. Further, the second end portion is coupled to the respective earphone assembly (102, 104) via an adjustable mounting member. The boom module comprises one channel 116 connected to the respective housing 110 of the earphone assembly (102, 104). The boom arm 114 extends from the housing 110 configured to move between an extended state and a retracted state. Further, the boom module enables to position the video screen module at a position selected by the user. Further, the headset 100 comprises a strap 138. The strap 138 enables to secure the headset 100 to the user's head.

In one embodiment, the left earphone assembly 102 comprises a left detachable video screen module attached to a retractable left boom module. In one embodiment, the right earphone assembly 104 comprises a right detachable video screen module attached to a retractable right boom module. The left video screen module comprises at least two left video screens and the right video screen module comprises at least two right video screens. The left and right video screens are embedded with a two-way camera configured to enable two-way video and audio communication. The two left video screens comprise a first left video screen (also referred as a first video screen 112A) and a second left video screen (also referred as a second video screen 112B) connected to the first left video screen via an adjustable swivel type mechanism. The first left video screen faces the user and the second left video screen faces away from the user's face. The two right video screens comprise a first right video screen (also referred to as a first video screen 112A) and a second right video screen (also referred to as a second video screen 112B) connected to the first right video screen via an adjustable swivel type mechanism. The first right video screen faces the user and the second right video screen faces away from the user's face.

The headset 100 for streaming audio and video data further comprises a communication module connected to the control module. The communication module is configured to connect with one or more external devices 134. Further, the control module is in communication with the communication module and video screen module that enables it to stream audio and video data into the video screen module.

Referring to FIG. 1, FIG. 2, FIG. 3, FIG. 6, FIG. 8, FIG. 9, FIG. 10, FIG. 12, FIG. 13, FIG. 16 and FIG. 17, the headset 100 for streaming audio and video data comprises a block 120 and a camera module in communication with the control module. The block 120 is disposed at a top portion of the headband frame 122. Further, the block 120 comprises a top side, a front side, and a rear side opposite to the front side. The block 120 is removably attached to the headband frame 122.

Referring to FIG. 1 to FIG. 17, the camera module is in communication with the control module. The control module comprises one or more cameras 124. Referring to FIG. 1, FIG. 5, FIG. 6, FIG. 8, FIG. 9, and FIG. 10, at least one camera 124 is disposed at the top side of the block 120 to face upwards to capture the area above the user. Referring to FIG. 1, FIG. 2, FIG. 3, FIG. 6, FIG. 8, FIG. 9, and FIG. 10, at least one camera 124 is disposed at the rear side of the block 120, and at least one camera 124 is disposed at the front side of the block 120. The cameras 124 that are disposed at the front side and at the rear side of the bock 120 provide coverage of the front and back environment of the user.

Referring to FIG. 1, FIG. 2, FIG. 3, FIG. 4, FIG. 6, FIG. 7, FIG. 8, FIG. 9, FIG. 10, FIG. 12, and FIG. 13, at least one camera 124 integrated within at least one video screen (112A, 112B). Further, at least one camera 124 is disposed at a left side of the headset frame 122 and at least one camera 124 is disposed at a right side of the headset frame 122. Referring to FIG. 2, FIG. 3, FIG. 4, FIG. 5, FIG. 6, FIG. 7, FIG. 8, FIG. 9, FIG. 10, and FIG. 11, the cameras 124 that are disposed at the left side and at the right side of the headset frame 122 provides coverage of the left and right environment of the user. In one embodiment, the camera 124 is a two-way camera configured to enable two-way video and audio communication. In one embodiment, at least one camera 124 is embedded at the first right video screen configured to undertake a selfie video and at least one camera 124 embedded at the second right video screen configured to capture environment opposite to the user. Further, at least one camera 124 is embedded at the first left video screen configured to undertake a selfie video and at least one camera 124 embedded at the second left video screen configured to capture environment opposite to the user.

Further, the cameras 124 are configured to capture a complete 360-degree field of view of the environment from a perspective of the user and a third party proximal to the user. In one embodiment, the camera 124 is an adjustable camera that can enable the user to adjust settings and angles of the adjustable cameras. Further, at least one camera 124 is disposed at the second end portion of the boom arm 114. In an embodiment, the second end portion comprises at least one camera 124 disposed on at least one first video screen, 112A faces the user and at least one camera 124 disposed on at least one second video screen 112B to face the environment opposite to the user. The camera 124 that is facing the user allows for a selfie video conference.

Referring to FIG. 1, FIG. 2, FIG. 3, FIG. 6, FIG. 8, FIG. 9, FIG. 10, FIG. 12, FIG. 13, FIG. 16 and FIG. 17, the headset 100 for streaming audio and video data further comprises a flashlight module in communication with the control module. The flashlight module comprises one or more light sources 126. Further, at least one light source 126 is disposed at the front side of the block 120 and at least one light source 126 is disposed at the rear side of the block 120. The flashlight illuminates the front and back environment of the user. The headset 100 further comprises a motion detector module in communication with the control module. The motion detector module comprises one or more motion sensors. Further, at least one first motion sensor is disposed at the second end portion of the boom arm 114 and at least one second motion sensor is disposed at the headset frame 122. In one embodiment, the second motion sensor is disposed at the block 120. The first motion sensor enables to track hand movement to control the video screens (112A, 112B). The first motion sensor further enables to control the video screen (112A, 112B) using hand gestures. Further, the second motion senor enables to detect presence of people proximal to the user.

The headset 100 for streaming audio and video data further comprises a speaker module in communication with the control module. The speaker module comprises one or more internal speakers, one or more external speakers, and one or more mini bass amplifying subwoofers. The internal speaker is disposed at the housing 110 of respective the earphone assembly (102, 104). Further, the external speaker is disposed at the headband frame 122 of the headset 100. Further, the mini bass amplifying subwoofers are mounted on the headband frame 122 to amplify bass frequencies of an audio output.

The headset 100 further comprises a microphone module in communication with the control module. The microphone module comprises one or more microphones. Further, at least one microphone is disposed at the headset frame 122 and at least one microphone at the second end portion of the boom arm 114.

The control module is configured to connect at least one external device 134 and stream audio and video data of the external device 134 on the video screen module of the left and right earphone assembly (102, 104). Further, the control module is configured to connect at least two external devices 134 and display video and audio data of each external device 134 separately in each of the right and left video screen modules. Further, the control module enables to accept, reject or end incoming calls using pre-programmed commands. The control module is further configured to detect the headset 100 being worn by user and streams audio and video data using internal speakers. Further, the control module is configured to detect an absence of headset 100 on the user's head and streams audio and video data using the external speakers. Further, the control module is configured to detect the headset 100 being worn by user and automatically enables communication using the internal speakers.

The control module enables to control the headset 100 using one or more pre-programmed voice commands. For example, a voice command "hello" enables to automatically accept the call using the headset 100. The voice command "hang up" automatically ends the call using headset 100. Additionally, the voice command "go to speakerphone"

enables to direct the audio to the external speaker of the headset 100. Further, the voice command "go to earphone" enables to direct the audio to go to the internal speaker of the headset 100.

The headset 100 for streaming audio and video data further comprises a power source module. The power source module is in communication with the control module comprising one or more rechargeable batteries 140 and a solar power module. The solar power module is detachably attached to the headset 100. Referring to FIG. 2, FIG. 3, FIG. 8, FIG. 9, FIG. 10, FIG. 13, and FIG. 16, the rechargeable batteries 140 within the inner surface portion of the headband frame 122. In one embodiment, the headset 100 includes right and left, removable, rechargeable batteries 140. Further, the right and the left removable rechargeable batteries 140 placed inside under the headband frame 122 on the right and left sides over the ear, respectively. The rechargeable batteries 140 are configured to provide power to the headset 100. Further, the rechargeable batteries 140 are recharged through an alternating current (AC) or direct current (DC) source of power via a USB port 130.

Further, the solar power module comprises one or more solar panels 136. The solar panel module 136 is disposed at an outer surface of the headband frame 122. Further, the solar panel module 136 is configured to supply power to the headset 100 and the rechargeable batteries 140. The solar panel module 136 automatically supplies the power to the headset 100 and the rechargeable batteries 140 when the headset 100 is not being charged through alternating current (AC) or direct current (DC) source of power. The solar panel module 136 is activated to supply power when the solar panel module 136 detects solar power or a light source. Further, the headset 100 comprises a Frequency Modulation (FM) and Amplitude Modulation (AM) frequency based built in radio module in communication with the control module.

The headset 100 for streaming audio and video data further comprises one or more ports (128, 130) in communication with the control module. The ports (128, 130) include one or more analog input ports 128 and one or more USB ports 130. Referring to FIG. 11, the analog input port 128 is disposed at a portion of the adjustable mounting member of the distal side of the housing 110. The analog input port 128 allows to establish a wired connection with one or more external devices 134. Referring to FIG. 2 to FIG. 17, the USB port 130 is on the headband frame 122 of the headset 100. At least one USB port 130 allows to supply power to the rechargeable batteries 140. At least one USB port 130 establishes a wired connection with one or more external devices 134 and allows to transmit audio, video, and data through a USB cable. In one embodiment, the headset 100 connects wirelessly to the external device 134 via Bluetooth and other wireless circuitry. It also has a GPS and Wi-Fi functionality to allow user tracking and other related functions. In one embodiment, the headset 100 could be connected to an external device 134 via a wired connection. The headset 100 has software to control features which can be updated remotely.

The headset 100 for streaming audio and video data further comprises one or more control buttons 132. The control buttons 132 in communication with the control module. The control buttons 132 further includes one or more radio control buttons, an on button, and an off button. The radio control buttons include a radio frequency search button, a preset button to access stored radio stations, and a volume control button. The radio control button enables the listening of Frequency Modulation (FM), Amplitude Modulation (AM) or Weather band radio. Further, the on button allows the user to turn on the headset 100 and the off button allows the user to turn off the headset 100.

The control button 132 further comprises at least one button to switch between external speakers and internal speakers, and to activate both the external speakers and the internal speakers. In one embodiment, the button to switch between external speakers and internal speakers could be a toggle switch. Further, the headset 100 comprises at least one button to activate the mini sub-woofers of the headset 100. Further, one or more control buttons 132 are disposed at a front side of the boom module facing the user to operate the cameras 124 and frequently used functions of the headset 100. Further, the headset 100 comprises at least one button to provide an area to store a remote control for the headset 100. The headset 100 comprises a remote-control bay in which a rechargeable remote control can be stored. The remote-control unit itself can be removed from its storage bay and used to operate the functions of the headset 100.

In one embodiment, the video screens (112A, 112B) attached to the right earphone assembly 104 and to the left earphone assembly 102 enable to display different programs by independently connected to different external devices 134. In another embodiment, the video screens (112A, 112B) attached to the right earphone assembly 104 and to the left earphone assembly 102 enable to display two different programs simultaneously by connecting to two different external devices 134. In one embodiment, the video screen (112A, 112B) connected to the right earphone assembly 104 could display the videos and audio from a memory card, while the video screen (112A, 112B) connected to the left earphone assembly 102 displays video and audio from an external device 134, or all the cameras 124 built into the headset 100 in a single view or vice versa.

In one embodiment, the video screens (112A, 112B) are removable from the boom module. In another embodiment, the video screens (112A, 112B) are touch enabled removable video screens (112A, 112B) on each side. In another embodiment, the block 120 including the flashlight and camera combo assembly or module are also removable from the headset frame 122. The solar panels 136 are also removable from the headset frame 122.

In one embodiment, the headset 100 has an additional USB port 130 to connect third party devices or external devices 134 to enable Augmented Reality (AR), Virtual Reality (VR), and Mixed Reality (MR) type functionalities.

Referring to FIG. 16 and FIG. 17, the headset 100 also has a slot 142 to insert a memory or storage card. The storage cards can be used to see audio and video content or to record content that is being captured by the cameras 124 and undertake further edit functions with corresponding control buttons 132.

In one embodiment, the headset 100 has retractable right and left boom arms 114 on which there are control buttons 132 toward the front side facing inside to the user to operate all the cameras 124 and other most needed functions of the headset 100.

In one embodiment, the headset frame 122 comprises a separate mini subwoofer speaker and at least one control button 132 to control the mini subwoofer speaker located on the headband frame 122. The headset 100 further comprises at least one removable and rechargeable battery 140 disposed under the surface of one side of the headband frame 122 and another battery 140 located under the surface of the opposite side of the headband frame 122. The headset 100 further comprises a GPS module in communication with the control module to remotely track a user wearing the headset 100.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A video headset for streaming audio and video data, comprising:
   a left earphone assembly;
   a right earphone assembly;
   a headband assembly having a headband frame, wherein the headband frame comprises a left end portion movably coupled to the left earphone assembly and a right end portion movably coupled to the right earphone assembly,
   wherein at least one earphone assembly comprises:
      a detachable video screen module comprising at least two video screens including a first video screen and a second video screen, wherein the first video screen and the second video screen are pivotally connected to each other, and wherein the second video screen faces in an opposite direction from the first video screen, and
      a retractable boom module configured to connect the video screen module to the respective earphone assembly, wherein the boom module comprising a boom arm having a first end portion configured to support the video screen module with respect to a field of view of a user and a second end portion coupled to the respective earphone assembly via an adjustable mounting member, wherein the boom module enables to position the video screen module at a position selected by the user;
   a communication module configured to connect with one or more external devices,
   a control module in communication with the communication module and video screen module enables to stream audio and video data in the video screen module, and
   a motion detector module in communication with the control module comprises one or more motion sensors, wherein at least one first motion sensor is disposed at the second end portion of the boom arm and at least one second motion sensor is disposed at the headband frame, wherein the first motion sensor enables to track hand movement to control the video screen and enables to control content displayed in the video screen using hand gestures and wherein the second motion senor enables to detect presence of people proximal to the user.

2. The video headset of claim 1, wherein the headband frame adapted to be worn over the head, and the left and right earphone assembly adapted to fit on the left ear and the right ear of a user, respectively.

3. The video headset of claim 1, is configured to operate as an analog audio headset or a digital headset.

4. The video headset of claim 1, further comprises:
   a block disposed at a top of the headset frame, wherein the block comprises a top side, a front side and a rear side opposite to the front side;
   a removable camera module in communication with the control module comprises one or more cameras, wherein the camera module is configured to capture front, rear and skyward environment of the user, wherein at least one camera is disposed at the top side of the block to face upwards, at least one camera is disposed at the rear side of the block to capture the rear side, and at least one camera is disposed at the front side of the block to capture a user's front view, at least one camera integrated with at least one video screen, at least one camera is disposed at a left side of the headset frame to capture a user's left side view, at least one camera is disposed at a right side of the headset frame to capture a user's right side view, at least one camera is disposed at a second end portion of the boom arm, wherein the camera is a two-way camera configured to enable two-way video and audio communication;
   a removable flashlight module in communication with the control module comprises one or more light sources, wherein at least one light source is disposed at the front side of the block and at least one light source is disposed at the rear side of the block, and
   a speaker module in communication with the control module comprises one or more internal speakers, one or more external speakers and one or more mini bass amplifying subwoofers, wherein the internal speaker is configured to deliver sound directly to the user's ear and the external speaker is configured to project sound into a surrounding environment.

5. The video headset module of claim 4, wherein the camera module comprises one or more adjustable cameras to adjust settings and angles of the adjustable cameras.

6. The video headset module of claim 1, further comprises a microphone module in communication with the control module comprises one or more microphones, wherein at least one microphone is disposed at the headset frame and at least one microphone at the second end portion of the boom arm.

7. The video headset module of claim 4, wherein the control module is configured to connect at least one external device and stream audio and video data of the external device on the video screen module of the left and right earphone assembly by Bluetooth or a wireless technology.

8. The video headset module of claim 4, wherein the control module is configured to connect at least two external devices and display video and audio data of each device separately in each of the right and left video screen module.

9. The video headset module of claim 4, wherein the control module enables to control the headset using one or more pre-programmed voice commands that can enable to automatically accept, reject or end incoming calls.

10. The video headset module of claim 4, wherein the control module is configured to detect the headset being worn by the user and streams audio and video data using internal speakers.

11. The video headset module of claim 4, wherein the control module is configured to detect an absence of headset on the user's head and streams audio and video data using the external speakers.

12. The video headset module of claim 4, wherein the control module is configured to detect the headset being worn by the user and automatically enables communication using the internal speakers.

13. The video headset of claim 1, further comprises:
a power source module in communication with the control module comprising one or more removable and rechargeable batteries configured to provide power to the headset and a removable solar power module configured to supply power to at least one of headset and the rechargeable batteries;
an FM and AM frequency based built in radio module in communication with the control module;
at least one slot in communication with the control module enables to insert a memory card to stream audio or video data through the headset with dedicated controls to operate, record and other functions on the headset;
a remote-control bay configured to store a rechargeable remote control, wherein the remote control enables to operate one or more features of the headset, and
a GPS module in communication with the control module to remotely track a user wearing the headset.

14. The video headset of claim 1, further comprises one or more ports in communication with the control module, wherein the ports including at least one analog input port to establish a wired connection with one or more external devices, and a USB port to establish a wired connection with one or more external devices and enable to supply power to the rechargeable batteries of the video headset.

15. The video headset of claim 1, wherein each earphone assembly comprises a housing comprising at least one internal speaker, and wherein the headband frame comprises at least one external speaker and a separate mini subwoofer speaker.

16. The video headset of claim 1, wherein the boom module comprises one channel connected to the respective housing and the boom arm extending from the housing configured to move between an extended state and a retracted state.

17. The video headset of claim 16, wherein the housing comprises a portion of surface configured to function as a mouse cursor control to manipulate the video data and audio data displayed at video screen module from paired external devices.

18. The video headset of claim 1, further comprises one or more control buttons in communication with the control module, wherein the control buttons comprising:
one or more radio control buttons including a radio frequency search button, a preset button to access stored radio stations, and a volume control button;
an on button to turn on the headset;
an off button to turn off the headset;
a button to adjust the treble frequency of the audio;
a button to adjust the bass frequency of the audio;
at least a single button to switch between external speakers and internal speakers, and to activate both the external speakers and the internal speakers and another mode to put it in an auto selection mode;
one or more control buttons are disposed at a front side of the boom module facing the user to operate cameras and frequently used functions of the headset, and
at least one button to control the mini subwoofer speaker located on the headband frame.

19. The video headset of claim 1, wherein the left earphone assembly comprises a left detachable video screen module attached to a retractable left boom module and wherein the right earphone assembly comprises a right detachable video screen module attached to a retractable right boom module, wherein the left video screen module comprises at least two left video screens and wherein the right video screen module comprises at least two right video screens, wherein the left and right video screens are embedded with a two-way camera configured to enable two-way video and audio communication, wherein the video screens are touch enabled removable video screens.

20. The video headset of claim 19, wherein the two left video screens comprise a first left video screen and a second left video screen connected to the first left video screen via an adjustable swivel type mechanism, wherein the first left video screen faces the user and the second left video screen faces away from the user's face.

21. The video headset of claim 19, wherein the two right video screens comprise a first right video screen and a second right video screen connected to the first right video screen via an adjustable swivel type mechanism, wherein the first right video screen faces the user and the second right video screen faces away from the user's face.

22. The video headset of claim 21, wherein at least one camera is embedded at the first right video screen configured to undertake a selfie video and at least one camera embedded at the second right video screen configured to capture environment opposite to the user.

23. The video headset of claim 20, wherein at least one camera is embedded at the first left video screen configured to undertake a selfie video and at least one camera embedded at the second left video screen configured to capture environment opposite to the user.

24. The video headset of claim 1, further comprises a USB port to connect third party devices to enable Augmented Reality (AR), Virtual Reality (VR), and Mixed Reality (MR) type functionalities.

25. The video headset of claim 1, further comprises at least one removable and rechargeable battery disposed on under the surface of one side of the headband frame and another battery located on under the surface of the opposite side of the headband frame.

26. The video headset of claim 1, further is controlled by applicable firmware and software that can be updated remotely as needed from time to time.

27. A video headset for streaming audio and video data, comprising:

at least one earphone assembly, and a headband assembly having a headband frame, wherein the headband frame comprises at least one end portion movably coupled to the at least one earphone assembly, wherein the at least one earphone assembly comprises:

- a detachable video screen module comprising at least one video screen, wherein the video screen has a built-in camera that can be used for capturing a selfie video or photo,
- a retractable boom module configured to connect the video screen module to the at least one earphone assembly, wherein at least one video screen is either detachably or non-detachably, and pivotally connected to the boom module with an inbuilt microphone, wherein the boom module comprising a boom arm having a first end portion configured to support the video screen module with respect to a field of view of a user and a second end portion coupled to the at least one earphone assembly via an adjustable mounting member, wherein the boom module enables to position the video screen module at a position selected by the user; wherein the video screen module comprises a first video screen and a second video screen, wherein the first and second video screens are pivotally connected to each other, each video screen comprising a camera and microphone, thereby the user can enable the second video screen to show the same content displayed in the first video screen or show different content in the second video screen: wherein the first video screen, and optionally the second video screen, show camera views or fields from the rear of the headband frame or from any other camera source, presented together in one view or separately, one at a time;
- a communication module configured to connect with one or more external devices, and
- a control module in communication with the communication module and video screen module enables to stream audio and video data in the video screen module, and
- a motion detector module in communication with the control module comprises one or more motion sensors, wherein at least one first motion sensor is disposed at the second end portion of the boom arm and at least one second motion sensor is disposed at the headband frame, wherein the first motion sensor enables to track hand movement to control the video screen and enables to control content displayed in the video screen using hand gestures and wherein the second motion senor enables to detect presence of people proximal to the user.

* * * * *